United States Patent Office 3,793,218
Patented Feb. 19, 1974

---

3,793,218
OIL SLICK DISPERSANT AND METHOD
Gerard P. Canevari, Cranford, N.J., assignor to Esso Research and Engineering Company
No Drawing. Filed June 15, 1971, Ser. No. 153,430
Int. Cl. B01f 17/00; B01j 13/00
U.S. Cl. 252—312         11 Claims

ABSTRACT OF THE DISCLOSURE

Mixtures of $C_{10}$–$C_{20}$ aliphatic carboxylic acids or the sorbitan monoesters thereof, sorbitan monoacylates, polyoxyalkylene adducts of the sorbitan monoesters and dialkyl sulfosuccinate salts having a hydrophilic-lipophilic balance of about 9 to about 11.5, preferably about 10 to 11, are highly efficient, nontoxic biodegradable dispersants for oil slicks. Oil slick dispersal is achieved by supplying the dispersant composition to the oil slick either alone or admixed with a suitable solvent. An advantage of these dispersant compositions is that they require little or no mixing energy in order to achieve dispersion of the slicks.

BACKGROUND OF THE INVENTION

The present invention relates to improved, biodegradable oil slick dispersants. More particularly, the present invention is directed to improved oil slick dispersant compositions and processes involving their use.

Water pollution occasioned by the discharge of oil into water resulting in the formation of objectionable oil slicks is a well-known hazard. A highly visible film having an area of about one square mile can be formed with only 50 gallons of oil. Such oil slicks or films are undesirable not only from an aesthetic standpoint, but also because cohesive oil films represents a barrier to the transfer of oxygen from the atmosphere to support marine life, a serious hazard to marine fowl, as well as a serious shore contaminate.

The pollution of water by oil is sometimes inadvertently occasioned by the discharge of ballast water from oil tankers or from offshore drilling operations. While the discharge of oil to the water in these situations is often inadvertent and is sought to be avoided, problems nevertheless do arise.

Various techniques have been advanced for solving the oil contamination problem. One solution involves the use of strong detergents to emulsify the oil with the water. Other dispersants for emulsifying the oil with the water have also been suggested. However, the use of strong detergents has resulted in severe damage to marine life. Other dispersants, while nontoxic, have not always proven effective for dispersing highly viscous sea-borne oil slicks. The dispersion of oil slicks on calm or relatively calm seas has been particularly troublesome, since prior art dispersants have required agitation or high energy mixing in order to achieve dispersion.

SUMMARY OF THE INVENTION

In accordance with the present invention, it has been found that intact cohesive oil films or oil slicks can be rapidly dispersed by contacting the same with a dispersant composition comprising a $C_{10}$–$C_{20}$ aliphatic monocarboxylic acid or sorbitan monoester thereof, a sorbitan monoester polyoxyalkylene adduct, and a dialkyl sulfosuccinate salt having a hydrophilic-lipophilic balance (HLB) number of about 9 to about 11.5, preferably about 10 to about 11. The dispersant composition can be applied to the oil slick either alone or in conjunction with a suitable solvent or diluent. Highly desirable results are achieved by spraying the dispersant system directly and as uniformly as possible onto the surface of the oil slick using approximately 1 part by weight of dispersant per 5 to 15 parts by weight of oil. It is ordinarily not necessary to agitate the oil slick in order to achieve effective dispersion. The ability of the dispersion compositions of this invention to achieve effective dispersion without agitation is a major advantage of the dispersants of this invention.

DESCRIPTION OF THE PREFERRED EMBODIMENT

The most effective lipophilic ingredient of the dispersant compositions of this invention is an aliphatic carboxylic acid or sorbitan monoester thereof. Usable aliphatic carboxylic acids are straight or branched chain saturated and unsaturated acids containing about 10 to about 20 carbon atoms. Preferred acids are straight chain saturated and monoethylenically unsaturated aliphatic monocarboxylic acids containing 12 to 18 carbon atoms. Representative acids include: capric acid, lauric acid, myristic acid, palmitic acid, margaric acid, stearic acid, nondecyclic acid, phyozaeic acid, oleic acid, elaidic acid, etc. These acids can be represented by the following general formula:

$$R\text{—COOH}$$

where R is a $C_9$–$C_{19}$ straight chain, branched chain or cyclic monovalent alkyl or alkenyl radical, preferably a straight chain alkyl or alkenyl radical.

The sorbitan monoesters of aliphatic carboxylic acids of the present invention are formed by the reaction of an aliphatic carboxylic long chain saturated or unsaturated fatty acid with a mixture of polyalcohols formed by the dehydration of sorbitol. The dehydration of sorbitol to the intermediate sorbitan compounds proceeds according to the following equations:

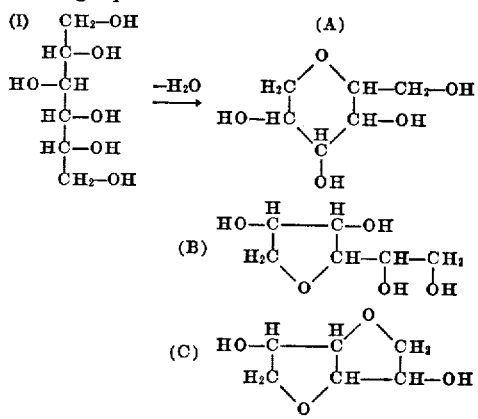

The above materials (products A, B and C) are all formed during the dehydration reaction.

Sorbitan monoesters are obtained by reacting Compound A, B or C, or their mixtures, with a fatty acid according to the following equations:

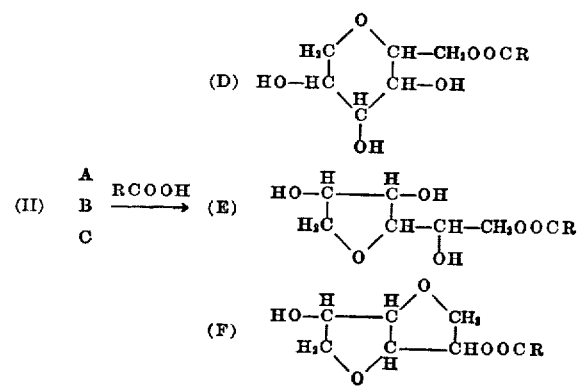

wherein R is as previously defined. As noted in Equation II, the esterification reaction involving a long chain monocarboxylic acid is quite specific as only certain of the available hydroxyl groups on the sorbitan material are subjected to the esterification reaction. The term "sorbitan monoacylate" as used herein is meant to denote Compounds D, E and F, alone or in admixture. These compounds may be represented by the general formula:

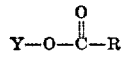

where R is as previously defined and Y is a monocyclic or bicyclic sorbitan radical (a sorbitan radical being defined as Compound A, B, C or their mixtures, the hydrogen atoms of one of the hydroxyl groups of the compounds being removed). Sorbitan monoester polyoxyalkylene adducts are formed by contacting sorbitan monoesters (Compound D, E or F or their mixtures) with a 1,2-alkylene oxide, thereby reacting one or more of the remaining hydroxyl groups from the sorbitan monoacylate to form compounds containing one or more polyoxyalkylene groups. When ethylene oxide is employed, the resulting polyoxyethylene groups have the structural formula $-(CH_2CH_2O)_nH$. When propylene oxide is used, the polyoxypropylene groups possess a structural formula:

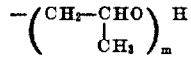

In the above structural formulas, $n$ has a value in the range of 6 to 30, preferably 15 to 22, and $m$ has a value in the range of 5 to 14. Since the polyoxyethylene and the polyoxypropylene radicals are polymeric products, a compound containing "$n$" ethylene oxide units or "$m$" propylene oxide units actually contains a fairly wide spectrum of groups with the numerical average being either $n$ or $m$. The expression "polyoxyalkylene sorbitan monoacylate" is intended to encompass the polyoxyalkylene derivatives of Compounds D, E and F and their mixtures. These derivatives can also be defined as polyoxyalkylene adducts of $C_{10}$–$C_{20}$ aliphatic monocarboxylic acids in which the adduct has from 6 to 30 (preferably 15 to 22) polyoxyethylene units or from 5 to 14 polyoxypropylene units per mole of ester. These polyoxyalkylene sorbitan monoacylates are commercially available under various trade names. They may be denoted by the general formula:

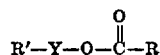

wherein R and Y are as previously defined and R' is a polyoxyalkylene radical, preferably a polyoxyethylene group having the general formula $(CH_2CH_2O)_nH$ wherein $n$ is from 6 to 30, preferably 15 to 22, or a polyoxypropylene group having the general formula:

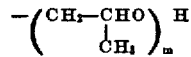

wherein $m$ varies from 5 to 14. It is understood that the polyoxyethylene or polyoxypropylene radicals may be present on one or more of the available hydroxyl radicals of the cyclic compounds and, the values of $n$ and $m$ set forth above represent the average number of polyoxyethylene or polyoxypropylene groups present in the compound and not that the subject groups exist in one polymeric chain.

The anionic surfactant is a water-dispersable salt of a dialkyl sulfosuccinate wherein the alkyl group is a branched chain radical containing 8 or 9 carbon atoms. The preferred anionic surfactant is sodium dioctyl sulfosuccinate, or more precisely, sodium di(2-ethylhexyl) sulfosuccinate. This surfactant is commercially available under various trade names, such as "Aerosol OT" made by American Cyanamid Co., Wayne, N.J. Not all commercially available forms of this compound give precisely the same results in the dispersant compositions of the present invention, and the selection of a particular commercial surfactant and the proportioning of the same must be done so that the HLB value of the resulting composition is in the range of about 9 to about 11.5 as previously defined. In general, it appears that surfactants containing sodium dioctyl sulfosuccinate in relatively pure form are preferable over those in which this compound is in a less pure state. In general, the suitable anionic surfactants are those defined by the formula:

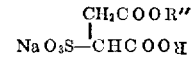

where R" is a $C_8$–$C_9$ branched chain alkyl group, preferably 2-ethyl hexyl.

As stated previously, the dispersant compositions of this invention have hydrophilic-lipophilic balance (HLB) values in the range of about 9 to about 11.5, preferably about 10 to about 11. Hydrophilic-lipophilic balance number is a measure of the relative hydrophilicity or lipophilicity of a surfactant or dispersant composition. Values range from 1 to 20, 1 indicating the most hydrophobic materials and 20 the most hydrophilic. For the purpose of this invention, the hydrophilic-lipophilic balance numbers (HLB) of the nonionic ingredients of the dispersant are determined according to the following equation:

$$HLB = \sqrt{\frac{\text{(Mol. wt. of hydrophilic compound used in synthesis of component A)}}{\text{(Mol. wt. component A)}} (20)\text{ (wt. percent of A in dispersant)}}$$

$$+ \frac{\text{(Mol. wt. of hydrophilic compound used in synthesis of component B)}}{\text{(Mol. wt. component B)}} (20)\text{ (wt. percent of B+ }\cdots\text{ in dispersant)}$$

In summary, HLB number is ascertained by dividing the molecular weight of the hydrophilic compounds employed in the synthesis of a given compound by the molecular weight of that compound and multiplying the result by 20. In situations where a plurality of materials is employed in a dispersant system, the HLB number for the total system is the summation of the HLB numbers of the individual components multiplied by the weight percent of that particular component in the total dispersant system. For example, the HLB number of the lauric acid ester of Compound A would be determined by dividing the molecular weight of the sorbitan material (the hydrophilic portion of the molecule), namely, Compound A, which has a molecular weight of 164, by the molecular weight of sorbitan monolaurate (Compound D) which is 346, and multiplying the result by 20. Thus, the HLB number for sorbitan monolaurate is 9.5. As is evident from the method employed in calculating HLB value, the HLB number of any given compound can be increased by adding polyoxyethylene or polyoxypropylene radicals to the compound or by diminishing the molecular weight of the alkyl or alkenyl portion of the monoacid employed in the synthesis of the initial sorbitan monoacylate.

The HLB numbers of ionic compounds, such as the anionic surfactants used in the dispersants herein, cannot be calculated as above described. However, the HLB value of the anionic surfactants can be approximated by adding the surfactant to water and visually determining the HLB value using the table in Becher, "Emulsions: Theory and Practice," Reinhold Publishing Corporation, New York, 1957, p. 190. Sodium dioctyl sulfosuccinate gives a translucent dispersion and has an HLB value of 10. The HLB values of mixtures which include an ionic compound are calculated from the weight percentage and HLB value of each component as above described.

The proportions of the three essential components of the dispersant compositions herein are such that the HLB value of the composition is in the range of about 9 to about 11.5, and preferably about 10 to about 11. Furthermore, the anionic surfactant constitutes from about 25 to about 35% by volume of the dispersant composition, exclusive of solvent. The presence of an anionic surfactant in addition to the carboxylic acid or sorbitan monoester thereof and the polyoxyalkylene derivative of the sorbitan monoester gives the compositions of the present invention a property which previous dispersant compositions containing only the two nonionic components do not possess. That is, the compositions of the present invention are capable of dispersing oil slicks with the application of little or no mixing energy, while dispersant compositions containing only an aliphatic carboxylic acid or sorbitan monoester thereof and a sorbitan monester polyoxyalkylene adduct as described herein require an application of mixing energy, agitation, in order to disperse an oil slick, even when the HLB value of such composition is in the same range as the HLB values of the present dispersant compositions. Best results in dispersing oil slicks are obtained in compositions using a sorbitan monoester rather than the free acid. Compositions using a sorbitan monoester are generally capable of dispersing an oil slick without the application of any mixing energy. Compositions employing a free fatty acid, on the other hand, usually require the application of a small amount of mixing energy, less than the amount required with previously known oil slick dispersants, to disperse an oil slick.

The compositions of the present invention may be applied to an oil slick either undiluted or diluted with a liquid organic medium in which the dispersant composition is either soluble or dispersable. Examples of suitable liquid media include the isoparaffinic and cycloparaffinic (naphthenes) hydrocarbons boiling within the range between about 210° F. and 500° F., such as 2,2,5-trimethylhexane; 2,6-dimethylheptane; 4-ethylheptane; cycloheptane, and the like. For economic reasons, it will be preferable to use commercial petroleum solvents which are mixtures of various isoparaffins and cycloparaffins. Such solvents are available from the Humble Oil & Refining Company under the trade name of "Isopar E," "Isopar G," "Isopar H," "Isopar K," "Isopar L," and "Isopar M." The dispersant composition of this invention can be mixed in the liquid organic medium in any desired proportions. Generally, it is desirable to mix one part by volume of the dispersant composition herein (solvent-free basis) with up to about 3 parts by volume of the liquid organic medium.

Oil slick dispersal can be achieved by spraying the total dispersant system (including solvent or diluent where used) directly onto the oil slick. It is desirable that the dispersant be applied onto the oil slick with a small diameter hose equipped with a spray nozzle to supply a uniform, fine spray for efficient distribution. It is not necessary or even desirable to apply the material from a high pressure hose. Preferably the dispersant system is applied from a work boat as opposed to applying material from a distant tanker or a pier. For large spills, mechanical modifications of this arrangement may be more appropriate. For example, the dispersant may be applied more efficiently to a larger area by a simple pipe manifold to which is affixed a plurality of spray nozzles. This applicator may be rigged from the side or the bow of the work boat in order to increase the area sprayed upon in each pass of the boat.

No agitation is necessary following application of the preferred dispersant compositions, i.e., those containing a sorbitan monoester, onto the oil film. This is a significant departure from previously used dispersant systems. Nor is it necessary or even desirable to apply the dispersant from a high pressure hose in order to achieve mixing energy. The preferred dispersant compositions of this invention, when appiled to an oil slick as herein described, break up the oil slick into small droplets of oil of substantially uniform diameter less than 0.5 micron, which are dispersed in the aqueous medium, e.g., an ocean in which an oil spill occurs. These droplets form a stable dispersion with little or no tendency to coalesce, so that the oil slick is broken up and does not tend to re-form. When other compositions of this invention, i.e., those containing a free fatty acid rather than the sorbitan monoester thereof, are applied to an oil slick, dispersion is substantial but incomplete. That is, a substantial portion of the oil is dispersed into fine droplets as above described, but some agitation is generally necessary to disperse the remainder of a slick.

Crude oil exhibits a low level of acute toxicity when dispersed and thereby made available to marine life which might not otherwise have come into contact with it. Persistent and long term effects of such dispersed oil have been cited as a major concern by marine biologists. The very fine droplets formed by the present invention, although having an acute toxicity similar to previously known dispersions, persist for only a short time once the marine life returns to an uncontaminated environment, i.e., away from the immediate area of the oil spill. Furthermore, harmful physical effects, such as coating of birds' wings with oil, are avoided entirely by the dispersions herein.

The invention will now be described with reference to the following specific examples.

EXAMPLE 1

To determine the effectiveness of dispersants of the present invention versus other dispersants, the following test procedure was used.

A standard 1000 ml. beaker was filled with 700 ml. of sea water and placed on a magnetic laboratory stirrer. A Teflon covered magnetic stirring bar was placed in the beaker. Two ml. of crude oil was placed on the surface of the water with a medicine dropper. The stirrer was then started at low speed to produce a vortex about ¾ inch deep. The vortex produced by the slight swirling action selectively drew down only fine detached oil droplets, less than about one micron in diameter, into the water column. The mixing energy produced by this low speed swirling was very slight, insufficient to break up the oil film on the water surface or to draw down oil droplets larger than about one micron in diameter. Immediately after the magnetic stirrer is started, 0.4 ml. of the chemical dispersant to be evaluated was added to the beaker at the vortex. The magnetic stirrer was operated as follows: one minute on, one minute off, one minute on.

After the magnetic stirrer was stopped, the degree of dispersion was observed visually. The preferred dispersant of this invention (No. 1) gave a uniform brown-colored dispersion, similar in appearance to chocolate milk, with no oil film remaining on the surface. Another dispersant of this invention (No. 2) gave some haze beneath the surface, with a surface oil film remaining. By comparison, other dispersant systems tested resulted in virtually clear water (no oil droplets or only a slight degree of haze) beneath a surface oil film. Comparison dispersant systems are designated by letters. Results are shown in Table I below.

TABLE I

| Component | Component HLB, percent | Dispersant composition, percent of— | | | | | |
|---|---|---|---|---|---|---|---|
| | | 1 | 2 | A | B | C | D |
| Oleic acid | 1.0 | | | 3 | 1.5 | | |
| "Span 80" (sorbitan mono-oleate) | 4.3 | 3 | 3 | | | 3 | 3 |
| "Tween 80" (sorbitan mono-oleate ethylene oxide adduct, 20 mols) | 15.0 | 5 | 5 | 5 | 5 | 5 | 5 |
| "Aerosol OT" (aqueous sodium dioctyl sulfosuccinate, 75%) | 10.0 | 5 | | | | | |
| "Triton GR-7" (sodium dioctyl sulfosuccinate, 64%) in hydrocarbon medium | 8.0 | | 5 | 5 | 5 | | |
| "MA 80" (sodium dihexyl sulfosuccinate) | 15.0 | | | | | 5 | 5 |
| "Isopar M" (isoparaffinic hydrocarbon solvent) | | 20 | 20 | 20 | 20 | 20 | 20 |
| HLB | | 10.6 | 9.9 | 9.1 | 10.1 | 12.6 | 9.3 |
| Degree of dispersion | | 100 | 50 | 0 | 0 | 0 | 10 |

The above results indicate that good spontaneous dispersion is obtained only in formulations containing an anionic surfactant in addition to the nonionic ingredients, and in which the HLB value of the anionic surfactant by itself is in the range of about 9 to about 11.

EXAMPLE 2

A dispersant having the following composition was prepared. Amounts are in percent by volume.

Oleic acid _____percent__ 16
Sorbitan mono-oleate ethylene oxide adduct (20 moles) ("Tween 80") _____do____ 32
Sodium dioctyl sulfosuccinate (64%) in hydrocarbon ("Triton GR-7") _____do____ 52
HLB _____do____ 9.1

One part by volume of the above dispersant composition was mixed with 5 parts by volume of crude oil and the resulting mixture was poured into a beaker containing sea water. The mixture appeared to break up into fine droplets on contact with the water. After the mixture was added to the sea water, the resulting mixture was stirred gently, dispersing the droplets uniformly throughout the beaker.

This experiment shows that the above formulation can be used effectively to disperse crude oil where it is possible to pre-mix the oil and dispersant. Such a situation would occur, for example, when spillage of oil from a tanker appears imminent. This experiment does not establish the effectiveness of the above formulation to disperse an oil spill which has already occurred.

Formulations containing fatty acids such as the one in this example have a slightly higher acute toxicity than those containing a sorbitan monoester as described in Example 1. For this reason, formulations containing the sorbitan monoester rather than the free acid are preferred.

What is claimed is:

1. A method for dispersing a layer of a hydrocarbon oil on water which comprises contacting said oil layer with a dispersant composition consisting essentially of (a) a sorbitan monoester of a $C_{10}$–$C_{20}$ aliphatic monocarboxylic acid, (b) a polyoxyalkylene adduct of a $C_{10}$–$C_{20}$ aliphatic monocarboxylic acid, said adduct having from 6 to 30 polyoxyethylene units or from 5 to 14 polyoxypropylene units per mole of ester, and (c) 25 to 35% by volume of said dispersant compositions of a water dispersable salt of a dialkyl sulfosuccinate wherein the alkyl group is a branched chain radical containing 8 or 9 carbon atoms, the HLB of said composition being in the range of about 9 to about 11.5.

2. A method according to claim 1 wherein the HLB value of said composition is in the range of about 10 to about 11.

3. A method according to claim 1 in which said composition contains a $C_{10}$–$C_{20}$ aliphatic monocarboxylic acid.

4. A method according to claim 1 in which said dispersant composition is sprayed onto the surface of said hydrocarbon oil layer.

5. A method according to claim 1 in which said hydrocarbon oil is crude oil.

6. A dispersant composition consisting essentially of (a) a sorbitan monoester of a $C_{10}$–$C_{20}$ aliphatic monocarboxylic acid, (b) a polyoxyalkylene adduct of a sorbitan monoester of a $C_{10}$–$C_{20}$ aliphatic monocarboxylic acid, said adduct having from 6 to 30 polyoxyethylene units or from 5 to 14 polyoxypropylene units per mole of ester, and (c) 25 to 35% by volume of said dispersant compositions of a water dispersable salt of a dialkyl sulfosuccinate wherein the alkyl group is a branched chain radical containing 8 or 9 carbon atoms, the HLB of said composition being in the range of about 9 to about 11.5.

7. A composition according to claim 6 in which the HLB value is in the range of about 10 to about 11.

8. A composition according to claim 6 in which (a) is a $C_{10}$–$C_{20}$ aliphatic monocarboxylic acid.

9. A method for dispersing a layer of hydrocarbon oil on water which comprises contacting said oil with a dispersant composition consisting essentially of (a) a sorbitan monooleate, (b) a polyethylene oxide adduct of sorbitan monooleate, and (c) a 75% aqueous solution of sodium dioctyl sulfosuccinate, the HLB of said composition being about 10.6.

10. The method of claim 1 wherein said water is sea water.

11. A dispersant composition consisting essentially of (a) a sorbitan monooleate, (b) a polyethylene oxide adduct of sorbitan monooleate, and (c) 25 to 35% by volume of said dispersant compositions of an aqueous solution of sodium dioctyl sulfonsuccinate, the HLB of said composition being about 10.6.

References Cited

UNITED STATES PATENTS 2,969,332   1/1961   Lawler et al. _____ 252—557

OTHER REFERENCES

Griffin: J. of the Society of Cosmetic Chemists, vol. 1 (1949), pp. 311–326.

Mil. Spec. S–22864 (Ships), Feb. 24, 1969.

Poliakoff: Oil Dispersing Chemicals, FWPCA, Edison Water Qual. Lab, Edison, N.J. (May 1969).

Schönfeldt: Surface Active Ethylene Oxide Adducts, Pergamon Press (1969), pp. 339, 405, 530.

JOHN D. WELSH, Primary Examiner

U.S. Cl. X.R.

252—8.55, 354, 356